United States Patent [19]

He et al.

[11] Patent Number: 5,610,385
[45] Date of Patent: Mar. 11, 1997

[54] OPTICAL BAR CODE SCANNER WHICH PRODUCES SUBSTANTIALLY PERPENDICULAR SCAN LINES

[75] Inventors: Duanfeng He, Ronkonkoma, N.Y.; Donald A. Collins, Jr., Duluth, Ga.

[73] Assignee: NCR Corporation, Dayton, Ohio

[21] Appl. No.: 392,595

[22] Filed: Feb. 23, 1995

[51] Int. Cl.⁶ .................................................. G06K 7/10
[52] U.S. Cl. ........................................................ 235/467
[58] Field of Search ............................. 235/467; 250/236

[56] References Cited

U.S. PATENT DOCUMENTS

| | | | |
|---|---|---|---|
| 3,995,166 | 11/1976 | Hobart et al. | 250/566 |
| 4,064,390 | 12/1977 | Hildebrand | 235/467 X |
| 4,333,006 | 6/1982 | Gorin et al. | 235/467 X |
| 4,652,732 | 3/1987 | Nicki | 235/462 |
| 4,799,164 | 1/1989 | Hellekson et al. | 235/467 |
| 4,851,667 | 7/1989 | Mergenthaler et al. | 250/236 |
| 4,861,973 | 8/1989 | Hellekson et al. | 235/467 |
| 4,955,693 | 9/1990 | Bobba | 350/319 |
| 4,960,985 | 10/1990 | Knowles | 235/467 |
| 4,999,482 | 3/1991 | Yang | 235/457 |
| 5,039,184 | 8/1991 | Murakawa et al. | 359/216 |
| 5,146,483 | 9/1992 | Rando | 372/24 |
| 5,166,820 | 11/1992 | Fujita | 359/211 |
| 5,229,588 | 7/1993 | Detwiler et al. | 235/467 |
| 5,475,207 | 12/1995 | Bobba et al. | 235/467 |

FOREIGN PATENT DOCUMENTS

406150039  5/1994  Japan ..................... 236/467

*Primary Examiner*—Donald T. Hajec
*Assistant Examiner*—Steven Wigmore
*Attorney, Agent, or Firm*—Paul W. Martin

[57] ABSTRACT

An optical bar code scanner which produces substantially perpendicular scan lines having an optical power sufficient to read bar code labels substantially perpendicular to the scanner. The scanner includes first and second folding pattern mirrors which produce the substantially perpendicular scan lines. A laser beam strikes the first folding pattern mirror along a first line of reflection substantially parallel to the scanner as the mirrored spinner rotates. The laser beam from the first folding pattern mirror strikes the second folding pattern mirror along a second line of reflection substantially perpendicular to the scanner as the mirrored spinner rotates to produce the substantially perpendicular scan line.

2 Claims, 3 Drawing Sheets

OPTICAL BAR CODE SCANNER WHICH PRODUCES SUBSTANTIALLY PERPENDICULAR SCAN LINES

BACKGROUND OF THE INVENTION

The present invention relates to optical bar code scanners, and more specifically to a bar code scanner which produces substantially perpendicular scan lines.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

In a typical bar code scanner, the optimal orientation of a bar code label for scanning is facing the scanner, with the lines and spaces of the bar code oriented perpendicular to the path of at least one scan line. Some angular disparity from the preferred parallel orientation of the label is tolerated by most scanners. But as bar code orientation changes from a this preferred orientation, the bar code label becomes harder to read. For most scanners, a bar code label oriented perpendicular to the scanner aperture is impossible to read.

It is desirable in designing today's scanners that the item orientation required of an operator be kept to a minimum. Therefore, a casually oriented merchandise item may place the bar code label in an orientation that differs from the preferred orientation.

Therefore, it would be desirable to provide a bar code scanner which produces substantially perpendicular scan lines to allow a bar code label oriented up to ninety degrees to the scanner aperture to be scanned and read.

SUMMARY OF THE INVENTION

In accordance with the teachings of the present invention, a bar code scanner which produces substantially perpendicular scan lines is provided. The scanner includes first and second folding pattern mirrors which produce the substantially perpendicular scan lines. A laser beam strikes the first folding pattern mirror along a first line of reflection substantially parallel to the scanner aperture as the mirrored spinner rotates. The laser beam from the first folding pattern mirror strikes the second folding pattern mirror along a second line of reflection substantially perpendicular to the scanner aperture as the mirrored spinner rotates to produce the substantially perpendicular scan line.

It is accordingly an object of the present invention to provide a bar code scanner which produces substantially perpendicular scan lines for reading bar code labels in an orientation substantially perpendicular to the scanner aperture.

It is another object of the present invention to provide a bar code scanner requires less bar code orientation by an operator.

BRIEF DESCRIPTION OF THE DRAWINGS

Additional benefits and advantages of the present invention will become apparent to those skilled in the art to which this invention relates from the subsequent description of the preferred embodiment and the appended claims, taken in conjunction with the accompanying drawings, in which:

DETAILED DESCRIPTION OF THE PREFERRED EMBODIMENT

Figure 1:
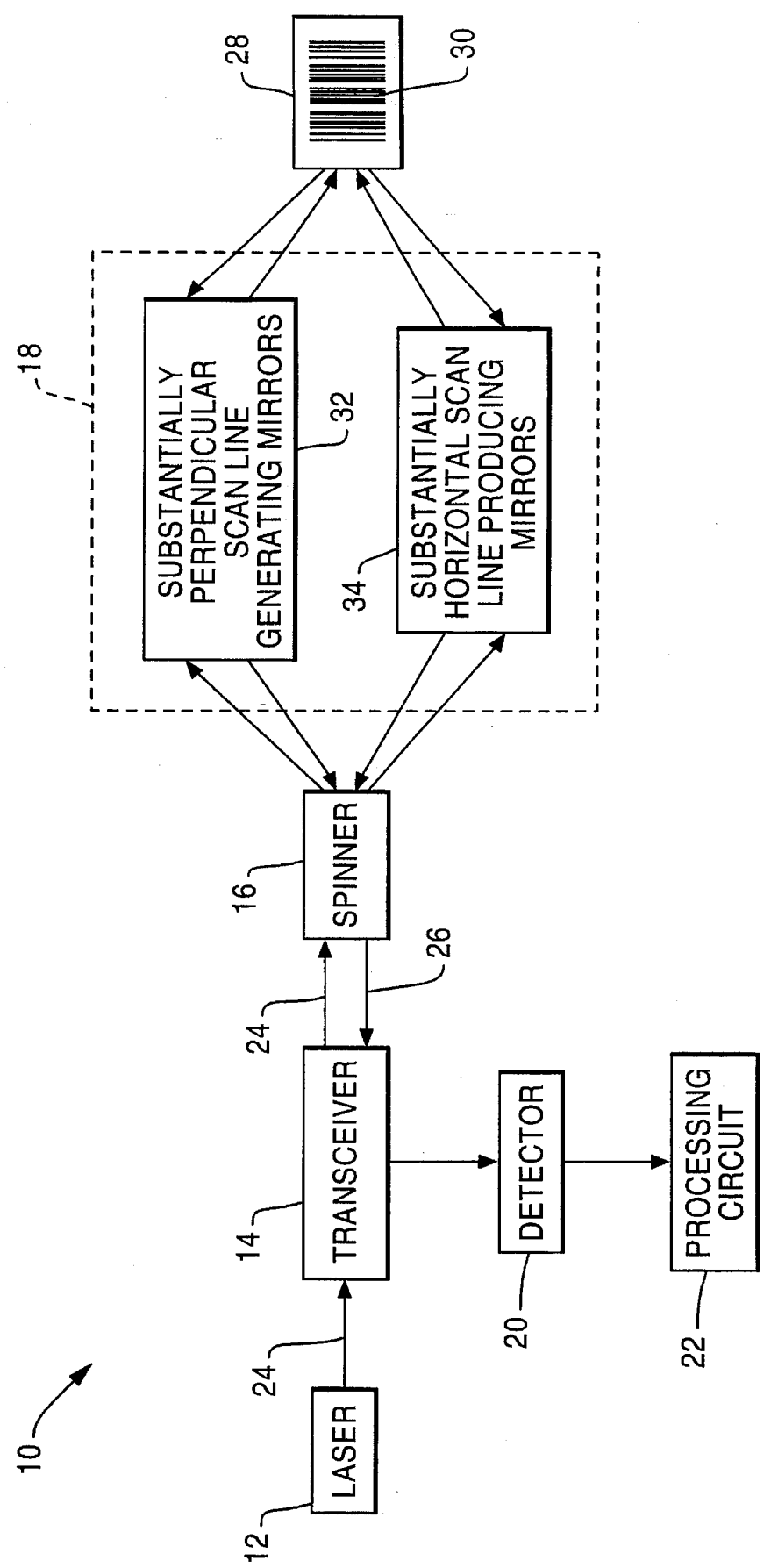
FIG. 1 is a block diagram of the bar code scanner of the present invention.

Referring now to FIG. 1, scanner 10 includes laser 12, optical transceiver 14, spinner 16, pattern mirrors 18, detector 20, and processing circuit 22.

Laser 12 is preferably a laser diode.

Optical transceiver 14 directs laser beam 24 to spinner 16 and directs light 26 reflected from an item 28 having a bar code label 30 to detector 20. Optical transceiver 14 is preferably a mirror with an aperture.

Spinner 16 includes a plurality of mirrored facets 70 which reflect laser beam 24 towards pattern mirrors 18. Spinner 16 is preferably a polygon spinner having four mirrored facets 70.

Pattern mirrors 18 direct laser beam 24 to form a scan pattern. Pattern mirrors 18 preferably include substantially perpendicular scan line generating mirrors 32 and substantially parallel scan line generating mirrors 34. Substantially perpendicular scan line generating mirrors 32 produce scan lines for reading bar code labels which are substantially perpendicular to the scanner's aperture 56 (FIG. 2), and thus produce an angle of incidence with the bar code label between zero and forty-five degrees. Substantially parallel scan line generating mirrors 34 produce scan lines for reading bar code labels which are substantially parallel to the scanner's aperture 56, and thus produce an angle of incidence with the bar code label between forty-five and ninety degrees.

Detector 20 converts reflected light 26 into electrical signals based upon the intensity of reflected light 26.

Processing circuit 22 decodes the bar code information from the electrical signals..

Figure 2:
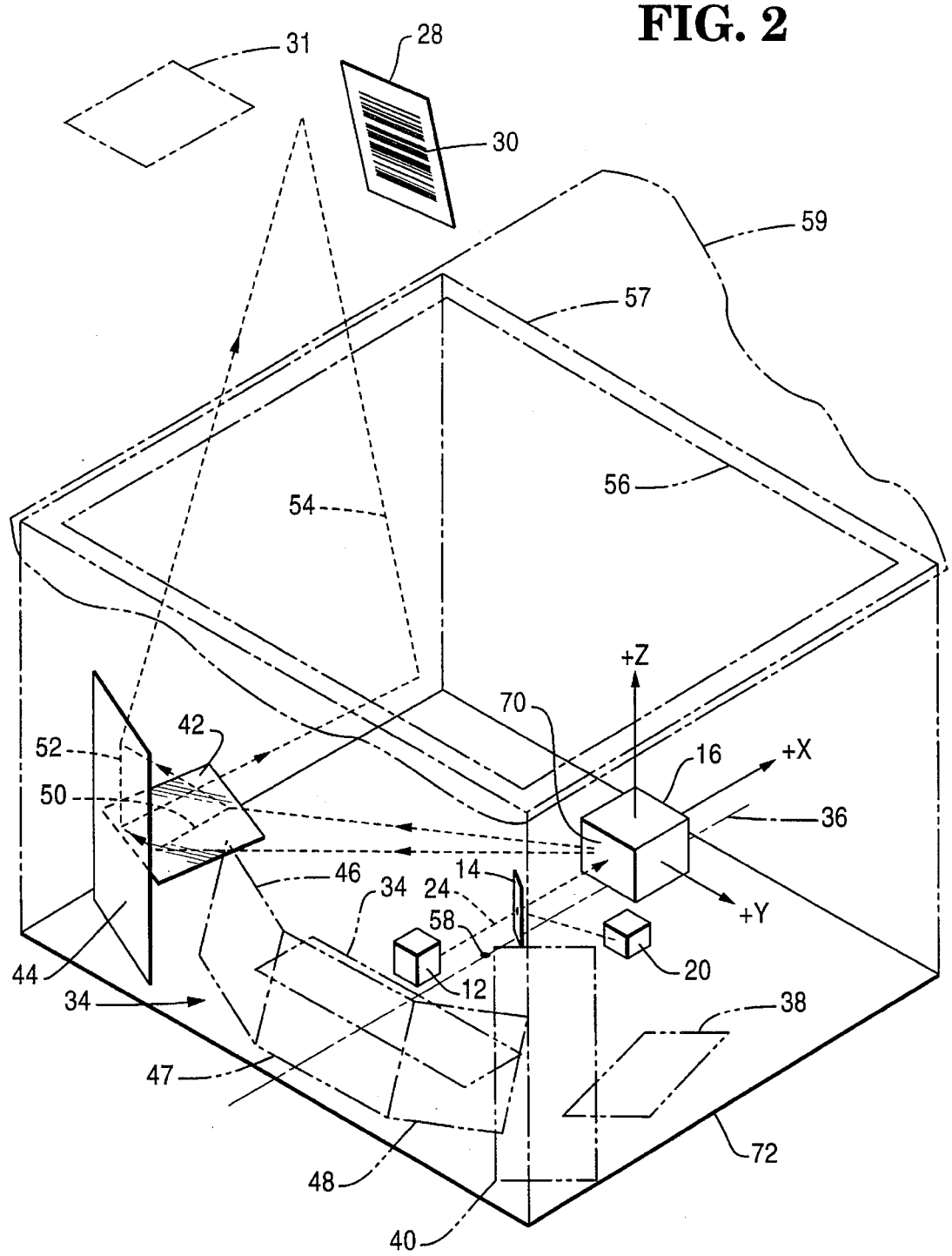
FIG. 2 is a perspective view of scanner components which form part of the present invention.

Turning now to FIG. 2, pattern mirrors 18 are preferably referenced to aperture 56 within scanner top surface 57, which is oriented in an X-Y plane. The X-Y plane is typically the plane in which a checkout counter surface 59 is oriented so that aperture 56 is substantially flush to surface 59. For presentation (vertically oriented) scanners, aperture 56 is typically oriented perpendicularly to surface 59. Pattern mirrors 18 are bi-symmetrically oriented about a centerline 36 as a group. For orientation purposes, directions are labeled as X, Y, Z. The scanning direction is in the -X direction.

Substantially parallel scan line generating mirrors 34 are located about scanner centerline 36 and include mirrors 46, 47 and 48. Substantially perpendicular scan line generating mirrors 32 preferably include mirror pairs 38-40 and 42-44, which are located at opposite ends of the substantially parallel scan line generating mirrors 34.

Mirror pairs 38-40 and 42-44 operate in the way to produce substantially perpendicular scan lines, which preferably strike bar code label 30 at an incidence angle between zero and forty-five degrees. Thus, mirror pairs 38-40 and 42-44 produce scan lines which are suited for scanning bar code label 31 oriented parallel to the scanner aperture 56 as well. The scan lines from mirror pairs 38-40 and 42-44 are without a significant diminution in optical power compared to scan lines produced by substantially parallel scan line generating pattern mirrors 34.

As spinner 16 rotates, scan beam 24 sweeps across mirrors 38 and 40 which produce a first substantially perpendicular scan line (not shown to reduce drawing clutter).

After sweeping substantially parallel scan line generating mirrors 34, scan beam 24 sweeps across mirror 42 to produce line of reflection 50. Mirror 42 directs scan beam 24 towards mirror 44 where it produces line of reflection 52. Thus, mirror 44 produces a second substantially perpendicular scan line 54.

Mirror pairs 38-40 and 42-44 effectively fold scan beam 24 so as to convert it from a substantially parallel scan line to a substantially perpendicular scan line.

The preferred orientations for mirror pairs 38-40 and 42-44 are shown in Table I below. Each mirror plane requires three points for each coordinate. The origin is at the center and bottom point 58.

TABLE I

|  | X | Y | Z |
|---|---|---|---|
| Mirror 38 | 55.6273 mm | −4.9685 mm | 68.9604 mm |
|  | 76.1710 mm | 26.5558 mm | 64.4633 mm |
|  | 60.3700 mm | 23.6993 mm | 28.3174 mm |
| Mirror 40 | 76.1710 | 26.5558 mm | 64.4633 mm |
|  | 64.1236 mm | 55.1843 mm | 68.0308 mm |
|  | 55.6273 mm | −4.9685 mm | 68.9604 mm |
| Mirror 42 | −55.6273 mm | −4.9685 mm | 68.9604 mm |
|  | −76.1710 mm | 26.5558 mm | 64.4633 mm |
|  | −60.3700 mm | 23.6993 mm | 28.3174 mm |
| Mirror 44 | −76.1710 | 26.5558 mm | 64.4633 mm |
|  | −64.1236 mm | 55.1843 mm | 68.0308 mm |
|  | −55.6273 mm | −4.9685 mm | 68.9604 mm |

Figure 3:
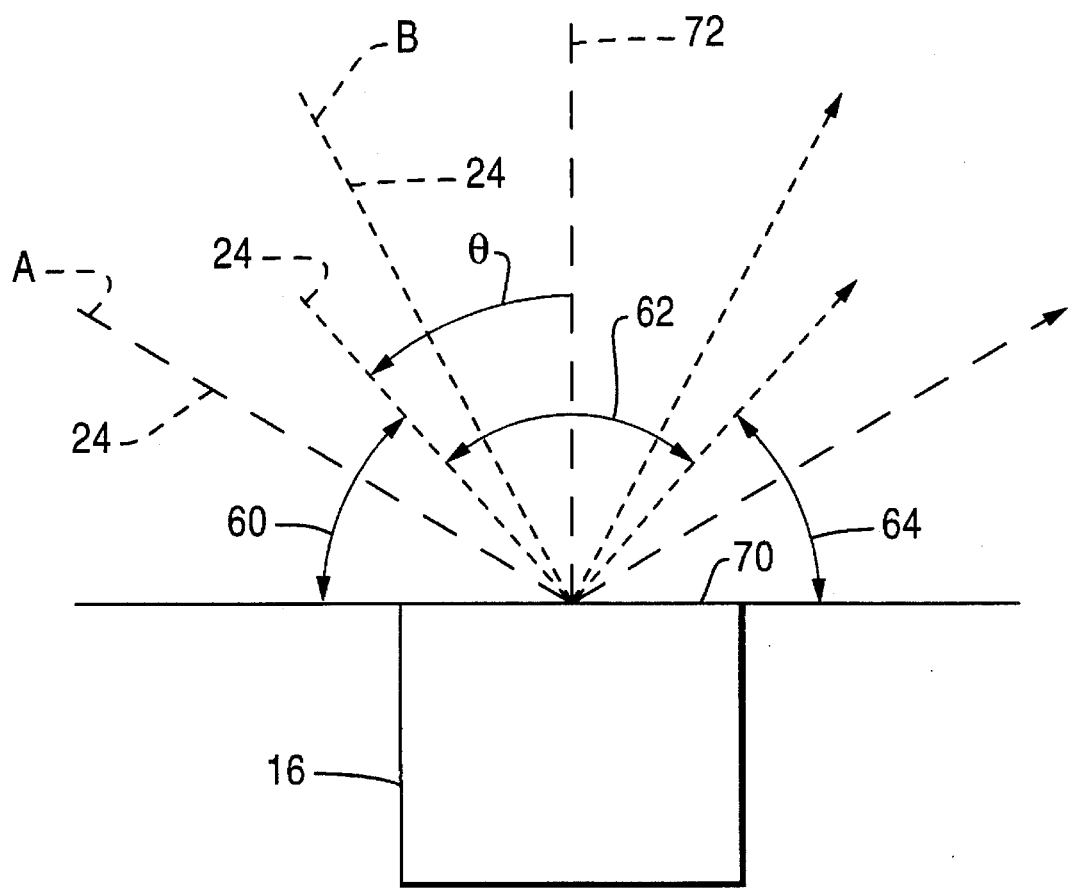
FIG. 3 is a top view of a spinner illustrating a distribution of spinner incidence angles.

Turning now to FIG. 3, spinner incidence angle $\theta$ is defined as the angle between scan beam 24 and a normal line 72 to spinner facet 70. Spinner incidence angles $\theta$ for spinner 16 are divided into sectors 60-64. Sector 62 is about 90 degrees while sectors 60 and 64 are about 45 degrees.

Scan beam A strikes spinner facet 70 at a spinner incidence angle $\theta$ which is between 45 degrees and 90 degrees. Thus, spinner 16 directs scan beam 24 at substantially perpendicular scan line generating mirrors 32.

Scan beam B strikes spinner facet 70 at a spinner incidence angle $\theta$ which is between zero and 45 degrees. Thus, spinner 16 directs scan beam 24 at substantially parallel scan line generating mirrors 34.

Although the present invention has been described with particular reference to certain preferred embodiments thereof, variations and modifications of the present invention can be effected within the spirit and scope of the following claims.

We claim:

1. A bar code scanner comprising:

a base member having a centerline;

a laser which produces a laser beam;

a top surface having an aperture through which the laser beam travels;

a rotating mirrored spinner which reflects the laser beam and which is located on the centerline;

a first group of pattern mirrors which is centered about the centerline and which produce a group of scan lines that are substantially parallel to the aperture for scanning a bar code label in an orientation substantially parallel to the aperture;

a second group of pattern mirrors on one side of the first group which produces a first scan line that is substantially perpendicular to the aperture for scanning the bar code label in orientations substantially perpendicular to the apeture and substantially parallel to the aperture, including first and second folding pattern mirrors, wherein the laser beam strikes the first folding pattern mirror along a first line of reflection as the mirrored spinner rotates, and wherein the laser beam from the first folding pattern mirror strikes the second folding pattern mirror along a second line of reflection as the mirrored spinner rotates to produce the first scan line;

a third group of pattern mirrors on another side of the first group which produces a second scan line that is substantially perpendicular to the apeture for scanning the bar code label having an orientation substantially perpendicular to the apeture, including third and fourth folding pattern mirrors, wherein the laser beam strikes the third folding pattern mirror along a third line of reflection as the mirrored spinner rotates, and wherein the laser beam from the third folding pattern mirror strikes the fourth folding pattern mirror along a fourth line of reflection as the mirrored spinner rotates to produce the second scan line;

a detector for converting light reflected from the bar code label to electrical signals based upon the intensity of the reflected light; and a mirror for directing the reflected light from the mirrored spinner to the detector.

2. A method for scanning a bar code label in an orientation substantially perpendicular to the scanner comprising the steps of:

producing a laser beam;

sweeping the laser beam in a first line substantially parallel to the scanner and across a first pattern mirror by a mirror spinner;

directing the laser beam from the first line to a second line substantially perpendicular to the scanner and on a second pattern mirror by the first pattern mirror; and directing the laser beam from the second line to form a scan line substantially perpendicular to the scanner by the second pattern mirror.

\* \* \* \* \*